(12) United States Patent  (10) Patent No.: US 8,384,718 B2
Dahlke  (45) Date of Patent: Feb. 26, 2013

(54) SYSTEM AND METHOD FOR NAVIGATING A 3D GRAPHICAL USER INTERFACE

(75) Inventor: Mikael Dahlke, Trångsund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 931 days.

(21) Appl. No.: 11/972,019

(22) Filed: Jan. 10, 2008

(65) Prior Publication Data

US 2009/0179914 A1 Jul. 16, 2009

(51) Int. Cl.
*G06T 11/20* (2006.01)

(52) U.S. Cl. ........................................ 345/467

(58) Field of Classification Search ............... 345/467
See application file for complete search history.

(56) References Cited

U.S. PATENT DOCUMENTS

| | | | | |
|---|---|---|---|---|
| 5,252,950 A | * | 10/1993 | Saunders et al. | 345/9 |
| 5,602,566 A | * | 2/1997 | Motosyuku et al. | 345/684 |
| 5,808,678 A | * | 9/1998 | Sakaegi | 348/333.03 |
| 5,991,355 A | * | 11/1999 | Dahlke | 377/15 |
| 5,994,710 A | * | 11/1999 | Knee et al. | 250/557 |
| 6,052,618 A | * | 4/2000 | Dahlke et al. | 600/523 |
| 6,201,554 B1 | * | 3/2001 | Lands | 345/169 |
| 6,269,174 B1 | * | 7/2001 | Koba et al. | 382/107 |
| 6,466,207 B1 | * | 10/2002 | Gortler et al. | 345/427 |
| 6,480,192 B1 | * | 11/2002 | Sakamoto et al. | 345/419 |
| 6,532,447 B1 | * | 3/2003 | Christensson | 704/275 |
| 6,757,422 B1 | * | 6/2004 | Suzuki et al. | 382/154 |
| 7,148,896 B2 | * | 12/2006 | Han et al. | 345/473 |
| 7,196,705 B2 | * | 3/2007 | Gallivan | 345/440 |
| 7,286,062 B2 | * | 10/2007 | Feyereisen et al. | 340/961 |
| 7,301,536 B2 | * | 11/2007 | Ellenby et al. | 345/419 |
| 7,620,404 B2 | * | 11/2009 | Chesnais et al. | 455/456.1 |

(Continued)

FOREIGN PATENT DOCUMENTS

FR 2 859 800 3/2005
WO 02/093331 11/2002

(Continued)

OTHER PUBLICATIONS

International Search Report and Written Opinion for corresponding International Application No. PCT/IB2008/001787 mailed Dec. 9, 2008.

(Continued)

*Primary Examiner* — Javid A Amini
(74) *Attorney, Agent, or Firm* — Renner, Otto, Boisselle & Sklar, LLP

(57) ABSTRACT

A system enables a user viewing a plurality of graphical objects rendered on a display screen of a mobile device to manipulate the renderings of each graphical object for purposes of selecting a first of the graphical objects. The system comprises the display screen and a facial proximity system determining the distance of the mobile device from the face of the user. A graphical user interface control system drives a rendering of the graphical objects on the display screen. Further, upon receiving an indication of a change in distance between the mobile device and the face of the user and, upon determining that the distance between the mobile device and the face of the user has changed, the graphical user interface control system modifies at least one of the size of the rendering of the graphical objects and the perspective of the rendering of the graphical objects on the display screen.

16 Claims, 6 Drawing Sheets

U.S. PATENT DOCUMENTS

| | | | | |
|---|---|---|---|---|
| 7,626,569 | B2* | 12/2009 | Lanier | 345/156 |
| 7,633,076 | B2* | 12/2009 | Huppi et al. | 250/559.36 |
| 7,788,587 | B2* | 8/2010 | Michelman | 715/734 |
| 7,865,834 | B1* | 1/2011 | van Os et al. | 715/756 |
| 2001/0055021 | A1* | 12/2001 | Freeman | 345/473 |
| 2003/0063128 | A1* | 4/2003 | Salmimaa et al. | 345/810 |
| 2005/0083246 | A1* | 4/2005 | Saishu et al. | 345/1.1 |
| 2005/0089213 | A1* | 4/2005 | Geng | 382/154 |
| 2005/0104848 | A1* | 5/2005 | Yamaguchi et al. | 345/156 |
| 2005/0286125 | A1* | 12/2005 | Sundstrom et al. | 359/462 |
| 2005/0289353 | A1* | 12/2005 | Dahlke | 713/182 |
| 2006/0052998 | A1* | 3/2006 | Michelman | 703/22 |
| 2006/0053388 | A1* | 3/2006 | Michelman | 715/775 |
| 2006/0053389 | A1* | 3/2006 | Michelman | 715/775 |
| 2006/0053392 | A1* | 3/2006 | Salmimaa et al. | 715/864 |
| 2006/0112350 | A1 | 5/2006 | Kato | |
| 2007/0019000 | A1* | 1/2007 | Motomura et al. | 345/619 |
| 2007/0058034 | A1* | 3/2007 | Numazaki et al. | 348/51 |
| 2007/0103776 | A1* | 5/2007 | Cok et al. | 359/451 |
| 2007/0118520 | A1* | 5/2007 | Bliss et al. | 707/5 |
| 2007/0176796 | A1* | 8/2007 | Bliss et al. | 340/995.14 |
| 2007/0250787 | A1 | 10/2007 | Kawahara et al. | |
| 2007/0300184 | A1 | 12/2007 | Song | |
| 2008/0071559 | A1* | 3/2008 | Arrasvuori | 705/1 |
| 2008/0100613 | A1* | 5/2008 | Woo et al. | 345/419 |
| 2008/0111889 | A1* | 5/2008 | Fujita et al. | 348/208.5 |
| 2008/0131111 | A1* | 6/2008 | Messina | 396/351 |
| 2008/0228393 | A1* | 9/2008 | Geelen et al. | 701/208 |
| 2008/0228449 | A1* | 9/2008 | Birtwistle et al. | 703/1 |
| 2009/0085911 | A1* | 4/2009 | Fitzmaurice et al. | 345/419 |
| 2009/0280860 | A1* | 11/2009 | Dahlke | 455/556.1 |
| 2009/0293012 | A1* | 11/2009 | Alter et al. | 715/810 |
| 2010/0053164 | A1* | 3/2010 | Imai et al. | 345/427 |
| 2010/0235089 | A1* | 9/2010 | Kato | 701/201 |
| 2010/0296802 | A1* | 11/2010 | Davies | 396/77 |
| 2011/0047466 | A1* | 2/2011 | Michelman | 715/734 |
| 2011/0169827 | A1* | 7/2011 | Spooner et al. | 345/420 |

FOREIGN PATENT DOCUMENTS

WO     2005/071604     8/2005

OTHER PUBLICATIONS

International Preliminary Report on Patentability for corresponding International Application No. PCT/IB2008/001787 mailed Jan. 22, 2010.

* cited by examiner

SYSTEM AND METHOD FOR NAVIGATING A 3D GRAPHICAL USER INTERFACE

TECHNICAL FIELD OF THE INVENTION

The present invention relates to a 3D graphical user interface, systems and methods for navigating a 3D graphical user interface and, more particularly, to systems and methods for manipulating renderings of objects for purposes of navigating such navigating a 3D graphical user interface.

DESCRIPTION OF THE RELATED ART

Graphical user interfaces, such as those provided by Microsoft Windows® and the various operating systems pioneered by Apple Computer Corporation have become somewhat of a standard for enabling a user to manipulate renderings of objects depicted within the graphical user interface for purposes of navigating and selecting various computer functions represented by objects within the graphical user interface.

For example, a mouse or other pointer device may be used to reposition a mouse pointer or cursor within the graphical user interface, select an object rendered within the graphical user interface, and initiate a call to a function represented by such object. The call to a function may be launching an application to open a file, opening a file within an existing application, "drilling down" into multi-level menus, and other functions commonly represented by objects depicted within a graphical user interface.

Contemporary mobile devices, including mobile telephones, portable data assistants (PDAs), and other mobile electronic devices often include a high resolution color display screen as well as the capability of running multiple software applications such a contacts directory application, a notes application, digital photo management applications, games, etcetera.

As such, use of graphical user interface systems for controlling mobile devices has become common. A user may use a touch panel, a stylus, a 5-way navigation control, or other control for manipulating renderings of objects depicted within the graphical user interface for purposes of navigating various computer functions represented by objects within the graphical user interface.

Three dimensional (3D) graphical user interface systems have also been proposed. For example, US Published Application 2007/0250787 A1 to Kawahara et al. describes an implementation of a 3D graphical user interface system on a mobile device. Kawahara et al. teaches that when an interrupting application requires user attention, the application that the user was interacting with prior to the interruption is represented by an object depicted in a slanted view—while the interrupting application is represented by an object depicted in a more prominent view.

Amongst active applications represented by objects depicted in a slanted view and applications represented by objects depicted in a more prominent view, the user may navigate utilizing a numeric keypad of the mobile device, a directional keypad, and jog-dial.

While 2D graphical user interfaces on mobile devices are common and while Kawahara et al. teaches use of a 3D graphical user interface system on a mobile device, a problem still exists in that the user interface of a mobile device typically comprises a keyboard with a limited quantity of keys (typically what is known as a "12-key" or "traditional telephone" keyboard), and the pointing device—if present at all—may comprise a touch screen (or stylus activated panel) over the small display or a 5 way multi-function button. This type of user interface makes the user of any graphical user interface more cumbersome than on a typical computer system with a full QWERTY keyboard and mouse.

In view of the foregoing, what is needed is a 3D graphical user interface conveniently implemented on a mobile device, systems and methods for navigating such a 3D graphical user interface system and, more particularly, systems and methods for manipulating renderings of objects for purposes of navigating such navigating a 3D graphical user interface in a manner that does not require traditional use of a mobile device key pad or touch panel.

SUMMARY

A first aspect of the present invention comprises a system for enabling a user viewing a plurality of graphical objects rendered on a display screen of a mobile device to manipulate the renderings of each graphical object for purposes of selecting a first of the graphical objects and/or viewing detail, or sub-objects of such graphical object.

The system comprises the display screen, a facial proximity system determining the distance of the mobile device from the face of the user, and a graphical user interface control system. The graphical user interface control system: i) drives a base rendering of the graphical objects on the display screen; and ii) receives an indication of a change in distance between the mobile device and the face of the user.

Upon determining that the distance between the mobile device and the face of the user has changed, the graphical user interface control system modifies at least one of the size of the rendering of the graphical objects and the perspective of the rendering of the graphical objects on the display screen. In an exemplary embodiment, such change in the size or perspective may be for purposes of: i) creating a "zoomed-in" effect for rendering of more detailed information associated with sub-objects of the graphical object; and/or ii) creating a "zoomed-out" effect for rendering an overview of the information comprised by the graphical object.

Further, in response to receiving an indication of a reset event, the graphical user interface control system may modify at least one of the size of the renderings of the graphical object and the perspective of the renderings of the graphical objects on the display screen to return to the base rendering of the graphical objects.

In a first aspect, the system may further comprise a camera directed towards the face of the user and capturing a sequence of images of the face of the user. In such sub embodiment a distance analysis module: i) determines that the distance between the mobile device and the face of the user has increased when a size measurement of the user's face within an image is smaller than the size measurement of the user's face within a previous image; and ii) determines that the distance between the mobile device and the face of the user has decreased when the size measurement of the user's face within an image is larger than the size measurement of the user's face within a previous image. In each case, the distance analysis module generates the indication of a change in distance between the mobile device and the face of the user.

In a first sub embodiment: i) the indication of a change in distance between the mobile device and the face of the user includes an indication that the distance between the mobile device and the face of the user has decreased; and ii) modifying at least one of the size of the rendering of the graphical objects and the perspective of the rendering of the graphical objects on the display screen comprises replacing a rendering of a single object representing multiple sub objects with a rendering of each of the multiple sub-objects to create a "zoomed-in" effect.

In a second sub embodiment, the facial proximity system further comprises a viewing angle module determining a change in the user's viewing angle of the display. In this sub embodiment, the graphical user interface control system further receives an indication of the change in the user's viewing angle of the display screen and, upon determining that the viewing angle has changed, modifies the perspective of the rendering of the graphical objects on the display screen.

The viewing angle module may determine the change in the user's viewing angle of the display screen by determine that a position of the user's face within an image of the sequence of images is displaced from a position of the user's face within a previous image of the sequence of images. Modifying the perspective of the rendering of the graphical objects on the display screen may comprise replacing at least one selectable object with a non-selectable object.

In a third sub embodiment, the system may further comprise an accelerometer generating a signal representing acceleration of the mobile device. In this sub-embodiment, the viewing angle module receives the signal representing acceleration and determines a change in viewing angle of the display screen by determining that displacement of the users face between an image and a previous image and the signal representing acceleration of the mobile device both represent a similar change in viewing angle.

In a fourth sub embodiment, the accelerometer may further generate a selection signal representing a distinctive selection motion of the mobile device. The distinctive selection motion may be, for example, a brief shaking motion of the mobile device. In this sub embodiment, the graphical user interface control further receives the selection signal and, in response thereto, one of: i) repositions a graphical selector between a first object and a second object on the display screen; and ii) generates a selection signal to an application indicating selection of the graphical object on which the graphical selector is located.

In a second aspect, the facial proximity system may further comprises: i) a transmitter directing a signal directed towards the face of the user; ii) a receiver capturing a reflection of the signal form the face of the user; and iii) a distance analysis module. The distance analysis module: i) determines that the distance between the mobile device and the face of the user has increased when a time measurement between directing the signal and the receiver capturing a reflection of the signal is greater than a previous time measurement between directing the signal and the receiver capturing a reflection of the signal; and ii) determines that the distance between the mobile device and the face of the user has decreased when the time measurement between directing the signal and the receiver capturing a reflection of the signal is less than a previous time measurement between directing the signal and the receiver capturing a reflection of the signal. In each case, the distance analysis module generates the indication of a change in distance between the mobile device and the face of the user.

Again, in first sub embodiment: i) the indication of a change in distance between the mobile device and the face of the user includes an indication that the distance between the mobile device and the face of the user has decreased; and ii) modifying at least one of the size of the rendering of the graphical objects and the perspective of the rendering of the graphical objects on the display screen comprises replacing a rendering of a single object representing multiple sub objects with a rendering of each of the multiple sub-objects to create a "zoomed-in" effect.

In a second sub embodiment the facial proximity system may further comprises: i) an accelerometer generating a signal representing acceleration of the mobile device; and ii) a viewing angle module determining a change in viewing angle of the display screen and the face of the user by determining a viewing angle change associated with the signal representing acceleration of the mobile device. In this sub embodiment, the graphical user interface control system further receives an indication of the change in viewing angle of the display screen and the face of the user and, upon determining that the viewing angle has changed, modifies the perspective of the rendering of the graphical objects on the display screen. Again, modifying the perspective of the rendering of the graphical objects on the display screen may comprise replacing at least one selectable object with a non-selectable object.

In a third sub embodiment, the accelerometer may further generate a selection signal representing distinctive selection motion of the mobile device. In this sub embodiment, the graphical user interface control further receives the selection signal and, in response thereto, one of: i) repositions a graphical selector between a first object and a second object on the display screen; and ii) generates a selection signal to an application indicating selection of the graphical object on which the graphical selector is located.

In a fourth aspect, the facial proximity system may further comprise: i) an accelerometer generating an acceleration signal representing acceleration of the mobile device; and ii) a distance analysis module. The distance analysis module: i) determines that the distance between the mobile device and the face of the user has increased by determining that the acceleration signal represents acceleration of the mobile device away from the face of the user (consistent with such an increase); and ii) determines that the distance between the mobile device and the face of the user has decreased by determining that the acceleration signal represents acceleration of the mobile device towards from the face of the user (is consistent with such an decrease). In each case, the distance analysis module generates the indication of a change in distance between the mobile device and the face of the user.

Again, in a first sub embodiment: i) the indication of a change in distance between the mobile device and the face of the user may include an indication that the distance between the mobile device and the face of the user has decreased; and ii) modifying at least one of the size of the rendering of the graphical objects and the perspective of the rendering of the graphical objects on the display screen comprises replacing a rendering of single object representing multiple sub objects with a rendering of each of the multiple sub-objects to create a "zoomed-in: effect.

In a second sub embodiment, the facial proximity system may further comprise a viewing angle module determining a change in viewing angle of the display screen and the face of the user by determining a viewing angle change associated with the signal representing acceleration of the mobile device. In this sub embodiment, the graphical user interface control system further receives an indication of the change in viewing angle of the display screen and the face of the user and, and upon determining that the viewing angle has changed, modifying the perspective of the rendering of the graphical objects on the display screen. Again, modifying the perspective of the rendering of the graphical objects on the display screen comprises replacing at least one selectable object with a non-selectable object.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
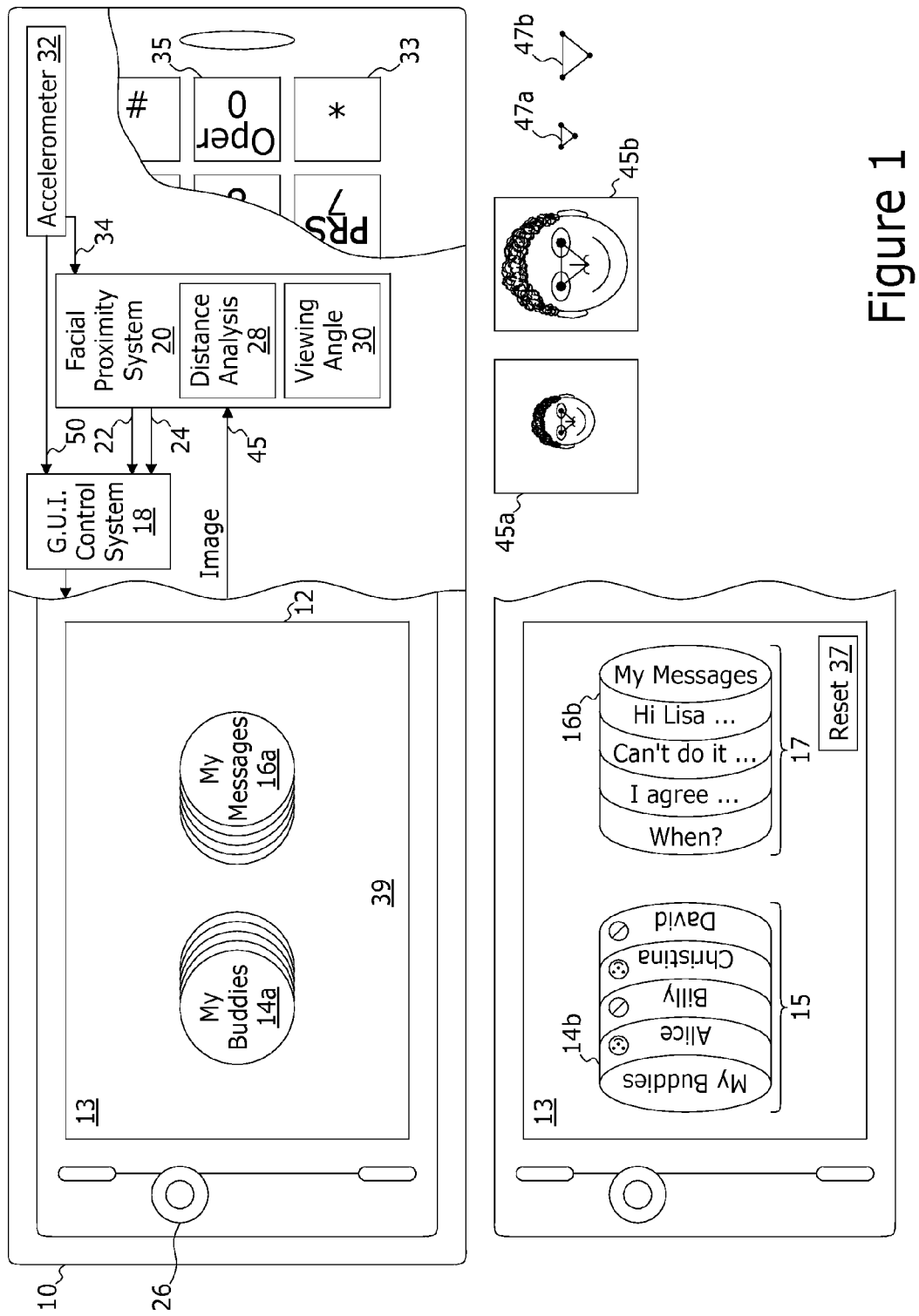
FIG. 1 is a diagram representing a first aspect of an exemplary system and method for navigating a three dimensional graphical user interface in accordance with one embodiment of the present invention.

The term "electronic equipment" as referred to herein includes portable radio communication equipment. The term "portable radio communication equipment", also referred to herein as a "mobile radio terminal" or "mobile device", includes all equipment such as mobile phones, pagers, communicators, e.g., electronic organizers, personal digital assistants (PDAs), smart phones or the like.

Many of the elements discussed in this specification, whether referred to as a "system" a "module" a "circuit" or similar, may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

With reference to FIG. 1, an exemplary mobile device 10 is embodied in a mobile telephone, mobile PDA, digital camera, MP3 player, or other hand held mobile device with a display screen 12 for rendering a three dimensional (3D) graphical user interface 13 comprising objects 14a, 16a representing data or functions of the mobile device 10. The 3D graphical user interface 13 differs from a 2D graphical user interface in that each object 14a, 16a includes a perspective shape providing a visual effect that the object has depth and that various levels of depth depict sub objects or sub functions—as is represented by an alteration of the perspective of object 14a to object 14b as depicted in FIG. 1.

A three dimensional (3D) graphical user interface control system 18 operates the 3D graphical user interface 13 and drives the rendering of the objects 14a, 16a as well as manipulating a combination of the size and perspective of the objects 14a, 16a in accordance with the user navigating the graphical user interface 13 in accordance with the teachings of this invention.

In a first aspect, for purposes of enabling user navigation of such 3D graphical user interface 13, the mobile device may comprise a digital camera 26, a facial proximity system 20, and, optionally, an accelerometer 32.

The digital camera 26 may generate a sequence of images (or motion video) 45 for input to the facial proximity system 20. More specifically, the digital camera 26 may have a field of view directed towards the user such that when the user is viewing the display screen 12, the user's face is depicted within the sequence of images (or motion video) 45 as represented by thumbnail images 45a and 45b.

The facial proximity system 20 receives the sequence of images (or motion video) 45. A distance analysis module 28 may determine that the distance between the mobile device 10 and the face of the user has decreased when the size measurement of the user's face within an image (for example thumbnail image 45b) is larger than the size measurement of the user's face within a previous image (for example thumbnail image 45a). The distance analysis module may make such determination by comparison of a size measurement between readily recognized features of the user's face. For example, a triangle formed by the user's eyes and nose forms a measurement of readily recognized features of the user's face (e.g. eyes and nose)—and an increasing size of such triangle (as represented between triangles 47a and 47b) between images 45a and 45b represents a decrease in the distance between the mobile device 10 and the face of the user.

Similarly, the distance analysis module may determine that the distance between the mobile device and the face of the user has increased when a size measurement of the user's face within an image is smaller than the size measurement of the user's face within a previous image.

The distance analysis module 28, may generate a distance indication signal 22 in response to determining that the distance between the mobile device and the face of the user has either increased or decreased. The distance indication signal 22 may be input to the graphical user interface control system 18.

In response to receiving distance indication signal 22 indicating that the distance between the mobile device and the face of the user has decreased, the graphical user interface control system 18 may manipulate the rendering of the graphical user interface 13 to generate an effect of the user "zooming-in" into the graphical user interface 13. Such "zooming-in" effect may includes increasing the size of the graphical objects 14a, 16a or altering the perspective of each of the graphical objects to a "zoomed-in" perspective as depicted by graphical objects 14b, 16b. In this example, the "zoomed-in" perspective (objects 14b, 16b) include sub objects 15 and 17 which are labeled and may be individually selectable wherein the "zoomed-out" perspective (objects 14a, 16a) does not depicts labels for the sub objects—nor are the sub objects individually selectable.

Figure 2:
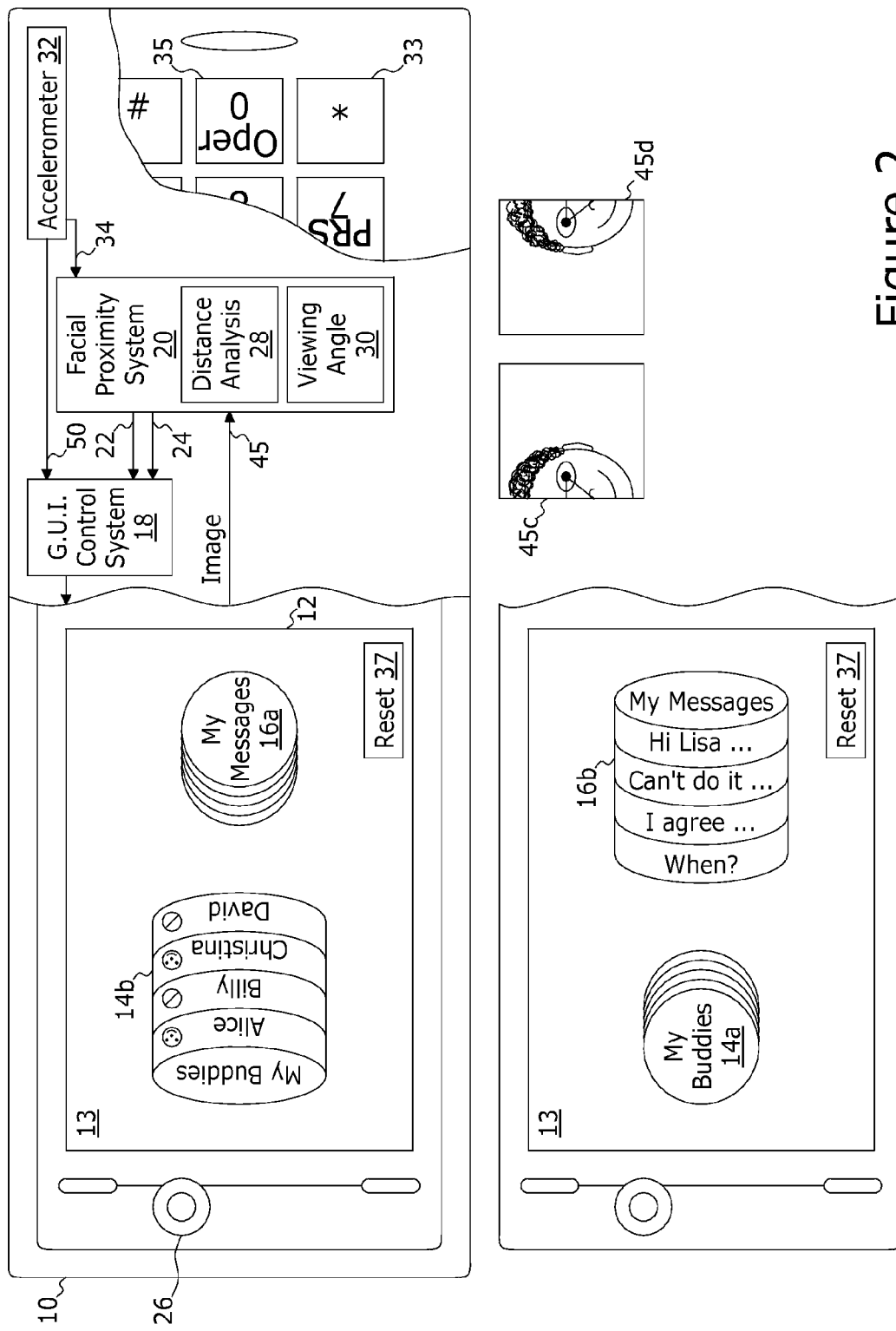
FIG. 2 is another diagram representing a first aspect of an exemplary system and method for navigating a three dimensional graphical user interface in accordance with one embodiment of the present invention.

Turning to FIG. 2, the facial proximity system 20 may further include a viewing angle module 30. The viewing angle module 30 may determine that a change in the user's viewing angle of the display screen has occurred when a position of the user's face within an image (for example thumbnail image 45d) is displaced along a horizontal axis from the a position of the user's face within a previous image (for example thumbnail image 45c). In each case, the viewing angle module 30 generates an indication of a change in viewing angle 24 to the graphical user interface 18.

In response to receiving an indication of a change in viewing angle 24, the graphical user interface control system 18 may manipulate the rendering of the graphical user interface 13 to generate an effect of altering which of multiple objects has the "zoomed-in" perspective. As represented in FIG. 2, in response to the indication of changing viewing angle 24 along the horizontal axis, the graphical user interface control system 18 may alter the graphical user interface 13 such that object 14b ("zoomed-in" perspective) is altered in size and perspective to object 14a ("zoomed-out" perspective) and object 16a ("zoomed-out" perspective) is altered in size and perspective to object 16b ("zoomed-in" perspective).

Figure 3:
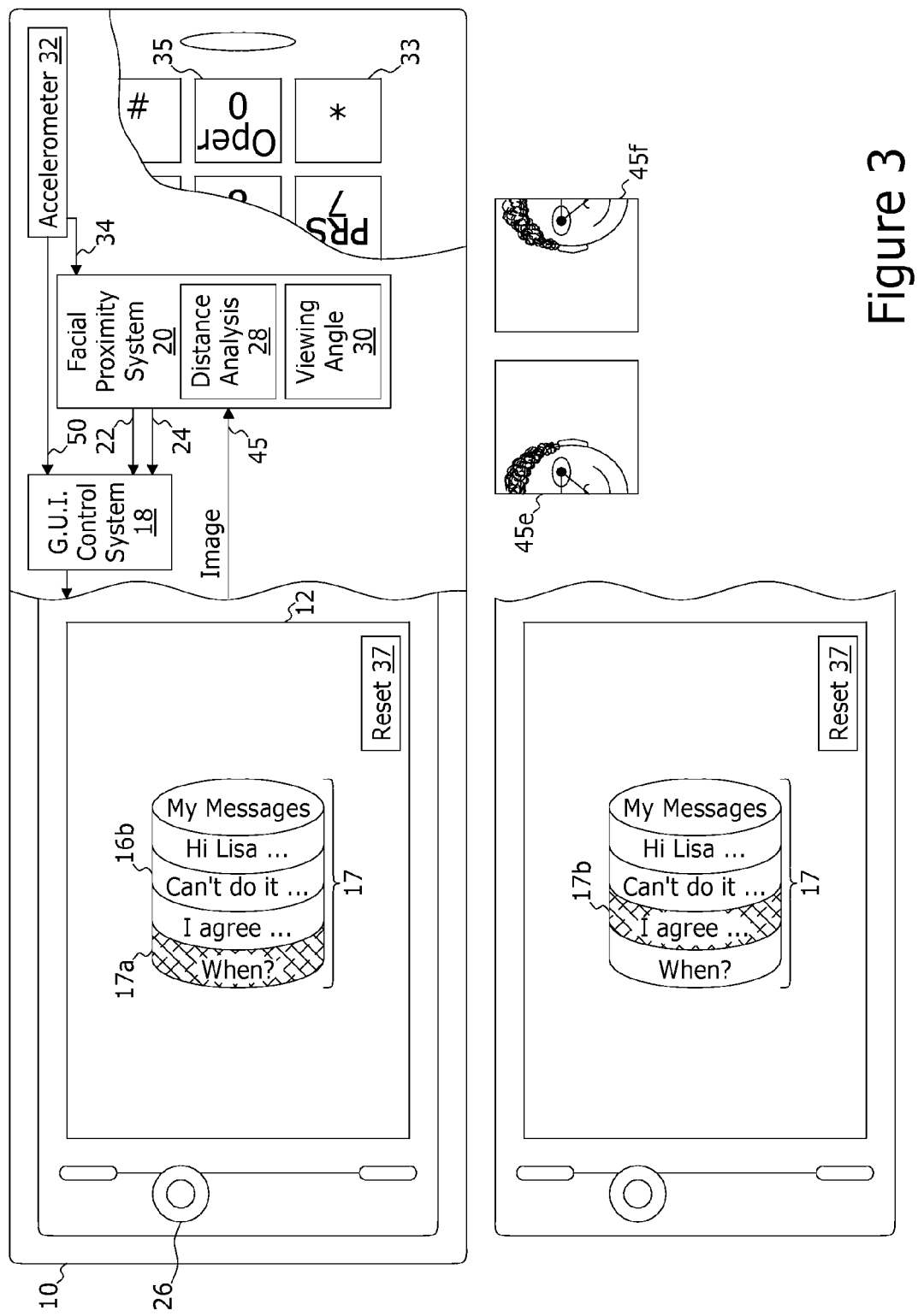
FIG. 3 is yet another diagram representing a first aspect of an exemplary system and method for navigating a three dimensional graphical user interface in accordance with one embodiment of the present invention.

Referring briefly to FIG. 3, if the graphical user interface 13 is in a state wherein an object, such as object 16b is depicted in a "zoomed-in" perspective with multiple selectable sub elements 17, in response to receiving an indication of a horizontal change in viewing angle 24 as represented by horizontal displacement of the user's face between frames 45e and 45f, the graphical user interface control system 18 may manipulate the rendering of the graphical user interface 13 to generate an effect of moving, or snapping a selector (such as a highlight bar) from a first of the sub elements (element 17a) to a second of the sub elements (element 17b).

Figure 4:
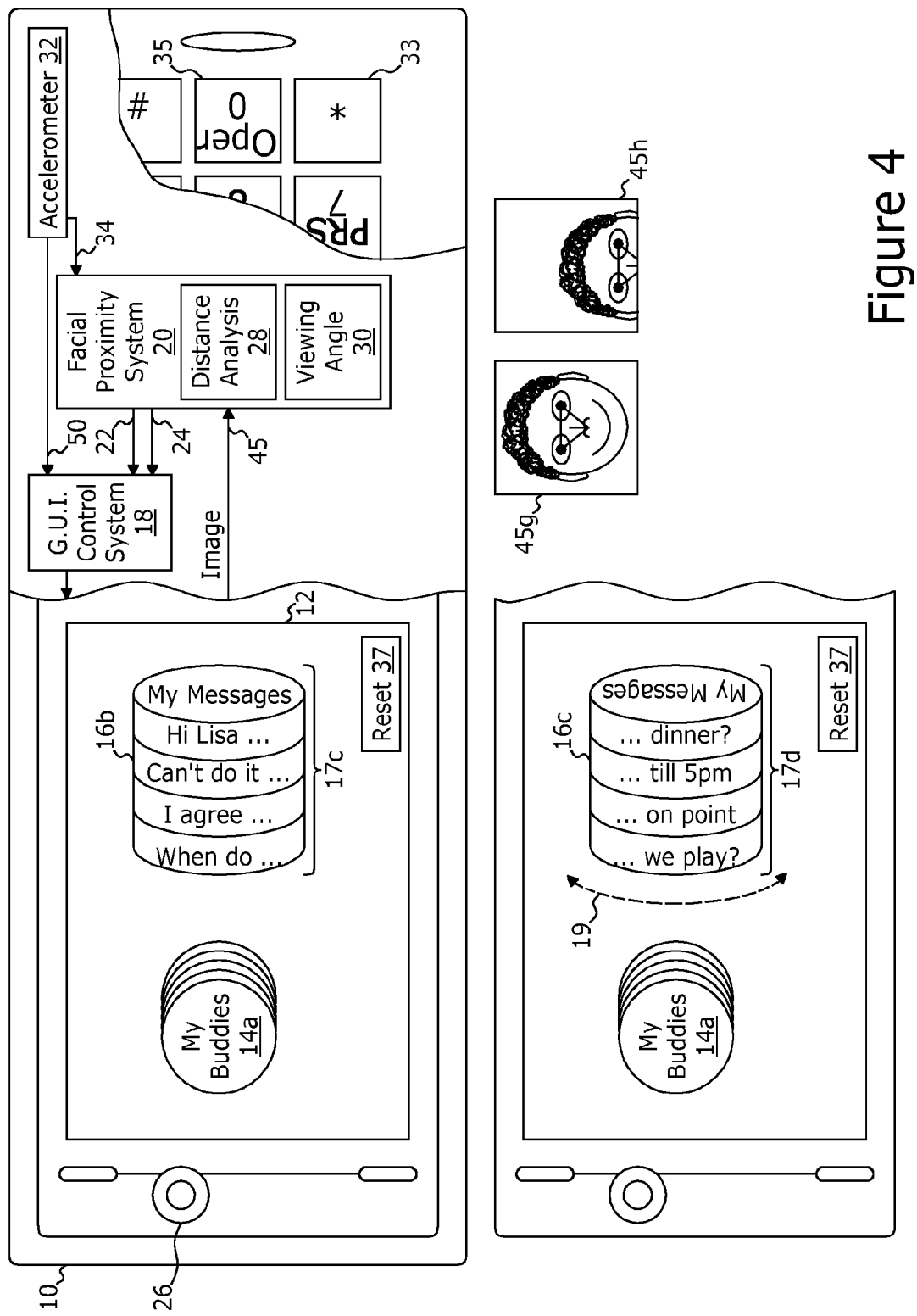
FIG. 4 is yet another diagram representing a first aspect of an exemplary system and method for navigating a three dimensional graphical user interface in accordance with one embodiment of the present invention.

Turning briefly to FIG. 4, the viewing angle module 30 may determine that a change in the user's viewing angle of the display screen has occurred when a position of the user's face within an image (for example thumbnail image 45h) is displaced along a vertical axis from the a position of the user's face within a previous image (for example thumbnail image 45g). Again, in each case, the viewing angle module 30 generates an indication of a change in viewing angle 24 to the graphical user interface.

As represented in FIG. 4, in response to the indication of changing viewing angle 24 along the vertical axis, the graphical user interface control system 18 may alter the graphical user interface 13 such that object 16b ("zoomed-in" perspective) is altered in perspective to object 16c (also a "zoomed-in" perspective) but with a perspective of being rotated (represented by dashed arrow 19) to display different data associated with each sub-elements 17c, 17d. More specifically, object 16b is a perspective rendering of a grouping of sub-objects stacked as a "barrel shaped" object 16b with certain text information displayed and with the appearance that additional information is hidden on the back side of the "barrel". Object 16c represents the rotated object such that text information previously hidden on the back side of the "barrel" is visible to the user.

With reference to FIG. 1, FIG. 2, FIG. 3, and FIG. 4 the accelerometer 32 may provide, to the facial proximity system 20, an acceleration signal 34—which may be an acceleration vector measurement representing both a direction and magnitude of acceleration of the mobile device 10. Both the distance analysis module 28 and the viewing angle module 30 may receive the acceleration signal 34. In such embodiment, the indication of a change in distance signal 22 may be a function of the acceleration signal 34 or a function of both a measurement of a change in distance as determined by a change in size of the user's face in the sequence of images 45 and the acceleration signal 34. Such function may comprise determining that the change in distance between the mobile device 10 and the user's face between an image and a previous image and the acceleration signal 34 both represent a similar change in distance.

Similarly, the indication of a change in viewing angle 24 may be a function of the acceleration signal 34 or a function of both a measurement of the change in viewing angle as determined by displacement of the user's face in the sequence of images 45 and the acceleration signal 34. Such function may comprise determining that the change in perspective of the user's face between an image and a previous image and the acceleration signal 34 both represent a similar change in viewing angle With specific reference to FIG. 3, the accelerometer 34 may further generate a selection signal 50 representing a distinct selection motion of the mobile device 10. An exemplary distinctive selection motion easily detectable by the accelerometer 34 may be a brief shaking motion of the mobile device 10. In this aspect, the graphical user interface 18 may receive the selection signal 50 and, in response thereto, one of reposition a graphical selector (for example a highlight bar) between a first object and a second object on the display and generate a selection signal to another application indicating selection of the graphical object within the graphical user interface.

Figure 5:
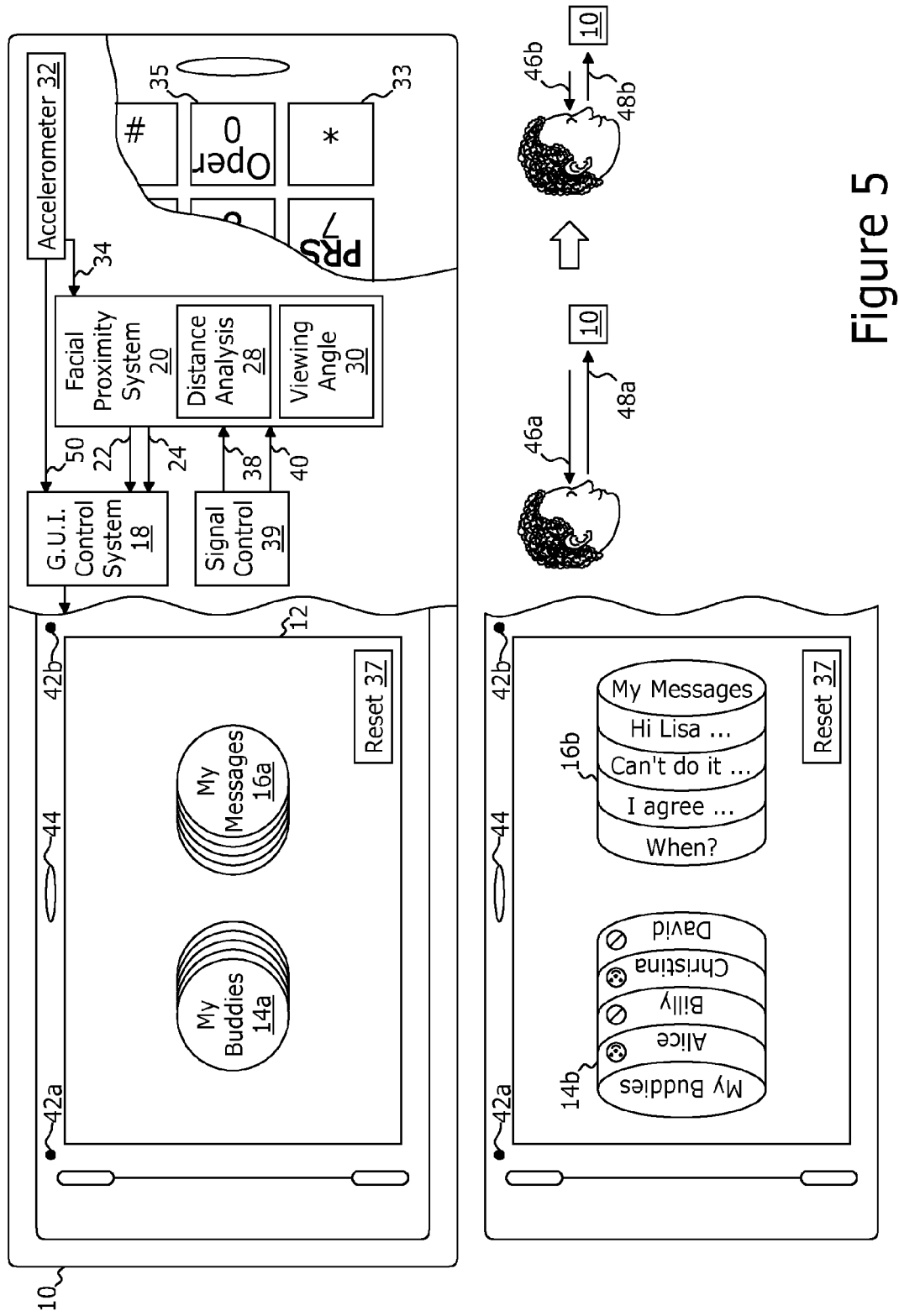
FIG. 5 is a diagram representing a second aspect of an exemplary system and method for navigating a three dimensional graphical user interface in accordance with one embodiment of the present invention.

Referring to FIG. 5, in a second aspect, for purposes of enabling user navigation of such 3D graphical user interface 13, the mobile device 10 may comprise a transmitter 44 directing a signal towards the face of the user, at least one receiver 42a, 42b capturing a reflection of the signal from the face of the user, and a distance analysis module 28.

In exemplary embodiments: i) the transmitter 44 may be an infrared transmitter which periodically transmits a pulse of infrared illumination towards the face of the user and the receivers 42a, 42b may detect reflected infrared illumination; or ii) the transmitter 44 may be an ultrasonic transmitter which periodically transmits a high frequency sound pulse towards the face of the user and the receivers 42a, 42b may be microphones detecting reflected sound at the frequency.

In either example, a signal control system 39 provides a signal 38 representing a time discrepancy between transmission of the signal from the transmitter 44 and reception of the reflected signal by the receivers 42a, 42b to the distance analysis module 28 of the facial proximity system 20. The signal control system 39 may also provide a signal 40 representing intensity of the reflected signal received at each receiver 42a, 42b.

The distance analysis module 28 determines that the distance between the mobile device 10 and the face of the user has decreased when the time measurement between the transmitter 44 directing the signal and the receiver 42a, 42b capturing a reflection of the signal (represented by transmitted signal 46b and reflected signal 48b) is less than a previous time measurement between directing the signal and the receiver capturing a reflection of the signal (represented by transmitted signal 46a and reflected signal 48a. Similarly, the distance analysis module 28 determines that the distance between the mobile device and the face of the user has increased when a time measurement between the transmitter 44 directing the signal and the receiver 42a, 42b capturing a reflection of the signal is greater than a previous time measurement between directing the signal and the receiver capturing a reflection of the signal.

In either case, the distance analysis module 28 may generate the change in distance indication signal 22 and, in response to receiving distance indication signal 22 indicating that the distance between the mobile device and the face of the user has decreased, the graphical user interface control system 18 may manipulate the rendering of the graphical user interface 13 to generate an effect of the user "zooming-in" into the graphical user interface 13. Such "zooming-in" effect may includes increasing the size of the graphical objects 14a, 16a or altering the perspective of each of the graphical objects to a "zoomed-in" perspective as depicted by graphical objects 14b, 16b.

The viewing angle module 30 may determine that a change in the user's viewing angle of the display screen has occurred when the intensity of the reflected signal (as indicated by signal 40) indicates a material change in the difference in: i) the intensity of the reflected signal as measured by receiver 42a and ii) the intensity of the reflected signal as measured at receiver 42b.

Again in this aspect, the accelerometer 32 may provide, to the facial proximity system 20, an acceleration signal 34—which may be an acceleration vector measurement representing both a direction and magnitude of acceleration of the mobile device 10. Both the distance analysis module 28 and the viewing angle module 30 may receive the acceleration signal 34. In such embodiment, the indication of a change in distance signal 22 may be a function of both a measurement of a change in distance as determined by a change in time required to detect a reflected signal directed towards the face of the user and the acceleration signal 34. Such function may comprise determining that the change in distance between the mobile device 10 and the user's face as determined by the change in time for detecting a reflected signal and the acceleration signal 34 both represent a similar change in distance.

Similarly, the indication of a change in viewing angle 24 may be a function of both a measurement of the change in viewing angle as determined by a material change in the difference between reflected signal intensity as measured at the receivers 42a, 42b and the acceleration signal 34. Such function may comprise determining that the change in perspective of the user's face as determined by a material change in the difference between reflected signal intensity as measured at the receivers 42a, 42b and the acceleration signal 34 both represent a similar change in viewing angle.

Figure 6:
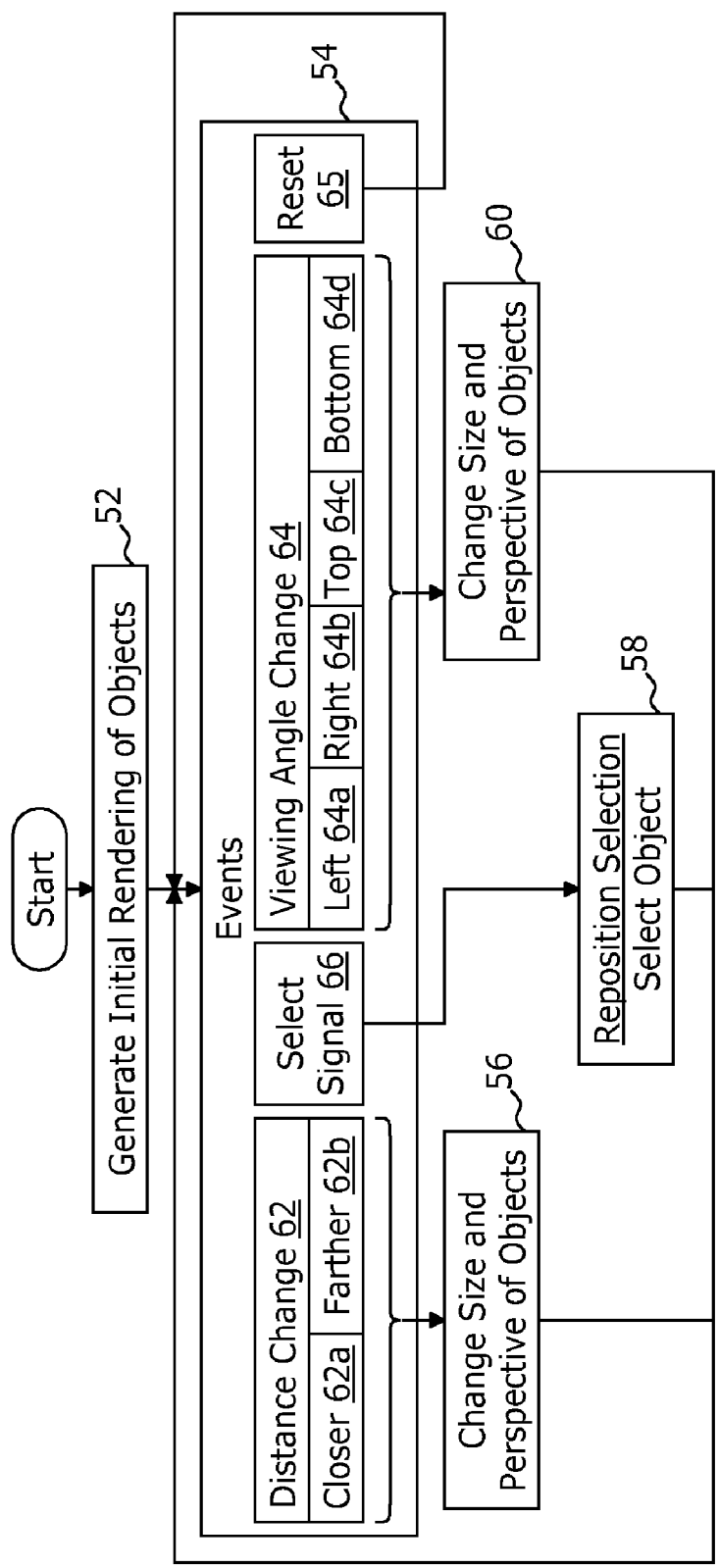
FIG. 6 is a flow chart representing exemplary operation of a graphical user interface control system in accordance with an embodiment of the present invention.

FIG. 6 represents a flow chart depicting exemplary operation of the graphical user interface control 18. Referring to FIG. 6 in conjunction with FIG. 1, step 52 represents generating an initial rendering of objects 14a, 16a within a graphical user interface 13 (e.g. a base view 39) on the display screen 12.

The initial rendering, or base view, may be generated at any time when it would be appropriate to reset the graphical user interface 13 to the base view 39. For example, generating the initial rendering may occur in response to the following reset events: i) after a predetermined period of time with no user interaction with the graphical user interface (e.g. an inactivity time out); or ii) in response to user input of a specific reset signal.

Examples of such a reset signal may be user activation of a particular key (for example the user holding the "*" key 33 for two seconds), user activation of a particular key sequence (for example the user activating the "*" key 33, the "0" key 35, followed by the "*" key 33 again—in sequence), a reset control 37 visible on the display 12 and activated by an overlaying touch panel, or a specific reset gesture which may be detected by the camera 26.

Box 54 represents various events that may drive modifying perspective and/or size of the objects 14a, 16a. Exemplary events include a distance change event 62 representing change in distance between the mobile device 10 and the face of the user. Event 62a is a change in distance wherein the mobile telephone 10 becomes closer to the user and event 62b is a change in distance wherein the mobile telephone 10 becomes farther from the user.

Another exemplary event comprises a viewing angle change event 64 representing a change in the user's viewing perspective of the display screen 12 on the mobile device 10. The change in viewing angle may be: i) horizontal displacement—meaning a shift to the left event 64a or a shift to the right event 64b, or ii) vertical displacement—meaning a shift to the top event 64c or a shift to the bottom event 64d.

Yet another exemplary event, a select signal event 66, may represent detecting the select signal 50 (generated by the accelerometer 34) in response to the unique selection motion.

Yet another exemplary event, a reset signal 65, may represent determining that the user interface is to be reset to the base view 39 (FIG. 1) as discussed above.

In response to a distance change event 62, the graphical user interface control 18 may change the size of the objects and the perspective of the objects as represented by the "zoom-in" and "zoom-out" effects described with respect to FIG. 1. Such change is represented by step 56.

In response to a horizontal displacement event (events 64a, 64b), the graphical user interface control 18 may change the perspective of the objects as represented by the effects described with respect to FIG. 2 and FIG. 3. Similarly, in response to a vertical displacement event (events 64c, 64d) the graphical user interface may change the perspective of the objects as represented by the effects described with respect to FIG. 4.

In response to a select signal 66, the graphical user interface control 18 may one of reposition a graphical selector (for example a highlight bar as depicted in FIG. 4) between a first object and a second object on the display and generate a selection signal to another application indicating selection of the graphical object within the graphical user interface.

In response to a reset event 65, the graphical user interface control 18 may, in accordance with step 52, generate the base view as discussed above.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A system for navigating a graphical user interface of a mobile device, the system comprising:
   a display screen;
   a facial proximity system determining the distance of the mobile device from the face of the user;

a three-dimensional graphical user interface control system configured to:
  drive a base rendering of a graphical object in perspective on the display screen, wherein the graphical object represents multiple sub-objects, each of the multiple sub-objects representing individually selectable data or functions of the mobile device; and
  receive an indication of a change in distance between the mobile device and the face of the user and, upon determining that the distance between the mobile device and the face of the user has changed, modify the perspective of the rendering of the graphical object on the display screen;
  wherein the indication of a change in distance between the mobile device and the face of the user includes an indication that the distance between the mobile device and the face of the user has decreased; and modifying the perspective of the rendering of the graphical object on the display screen comprises replacing a rendering of a single object with a rendering of each of the multiple sub-objects.

2. The system of claim 1, wherein the graphical user interface system further, in response to receiving an indication of a reset event, modifies the perspective of the renderings of the graphical object on the display screen to return to the base rendering of the graphical object.

3. The system of claim 2, wherein the facial proximity system comprises:
  a camera directed towards the face of the user and capturing a sequence of images of the face of the user;
  a distance analysis module:
    determining that the distance between the mobile device and the face of the user has increased when a size measurement of the user's face within an image is smaller than the size measurement of the user's face within a previous image; and
    determining that the distance between the mobile device and the face of the user has decreased when the size measurement of the user's face within an image is larger than the size measurement of the user's face within a previous image; and
    in each case, generating the indication of a change in distance between the mobile device and the face of the user.

4. The system of claim 3, wherein the facial proximity system further comprises:
  a viewing angle module determining a change in the user's viewing angle of the display screen; and
  the graphical user interface control system further receives an indication of the change in viewing angle of the display screen and, upon determining that the viewing angle has changed, modifying the perspective of the rendering of the graphical object on the display screen.

5. The system of claim 4, wherein the viewing angle module determines the change in the user's viewing angle of the display screen by determining that a position of the user's face within an image of the sequence of images is displaced from a position of the user's face within a previous image of the sequence of images.

6. The system of claim 4, modifying the perspective of the rendering of the graphical object on the display screen comprises replacing at least one selectable object with a non-selectable object.

7. The system of claim 1:
  further comprising an accelerometer generating a signal representing acceleration of the mobile device; and
  the viewing angle module receives the signal representing acceleration and determines a change in viewing angle of the display screen by determining that a change in perspective of the users face between an image and a previous image and the signal representing acceleration of the mobile device both represent a similar change in viewing angle.

8. The system of claim 7, wherein the accelerometer further generates a selection signal representing a distinctive selection motion of the mobile device; and
  the graphical user interface control further receives the selection signal and, in response thereto, one of i) repositions a graphical selector between a first object and a second object on the display screen; and ii) generates a selection signal to an application indicating selection of the graphical object on which the graphical selector is located.

9. The system of claim 2, wherein the facial proximity system comprises:
  a transmitter directing a signal directed towards the face of the user;
  a receiver capturing a reflection of the signal from the face of the user;
  a distance analysis module:
    determining that the distance between the mobile device and the face of the user has increased when a time measurement between directing the signal and the receiver capturing a reflection of the signal is greater than a previous time measurement between directing the signal and the receiver capturing a reflection of the signal; and
    determining that the distance between the mobile device and the face of the user has decreased when the time measurement between directing the signal and the receiver capturing a reflection of the signal is less than a previous time measurement between directing the signal and the receiver capturing a reflection of the signal; and
    in each case, generating the indication of a change in distance between the mobile device and the face of the user.

10. The system of claim 9, wherein:
  the indication of a change in distance between the mobile device and the face of the user includes an indication that the distance between the mobile device and the face of the user has decreased; and
  modifying the perspective of the rendering of the graphical object on the display screen comprises replacing a rendering of single object representing multiple sub objects with a rendering of each of the multiple sub-objects.

11. The system of claim 9, wherein the facial proximity system further comprises:
  an accelerometer generating a signal representing acceleration of the mobile device; and
  a viewing angle module determining a change in the user's viewing angle of the display screen by determining a viewing angle change associated with the signal representing acceleration of the mobile device; and
  the graphical user interface control system further receives an indication of the change in viewing angle of the display screen and, upon determining that the viewing angle has changed, modifying the perspective of the rendering of the graphical object on the display screen.

12. The system of claim 11, modifying the perspective of the rendering of the graphical object on the display screen comprises replacing at least one selectable object with a non-selectable object.

13. The system of claim 11, wherein the accelerometer further generates a selection signal representing a distinctive selection motion of the mobile device; and the graphical user interface control further receives the selection signal and, in response thereto, one of i) repositions a graphical selector between a first object and a second object on the display screen; and ii) generates a selection signal to an application indicating selection of the graphical object on which the graphical selector is located.

14. The system of claim 2, wherein the facial proximity system comprises:

an accelerometer generating a signal representing acceleration of the mobile device a distance analysis module:

determining that the distance between the mobile device and the face of the user has increased by determining that the signal is consistent with such an increase; and determining that the distance between the mobile device and the face of the user has decreased by determining a change in viewing angle of the display screen and the face of the user by determining a viewing angle change associated with the signal representing acceleration of the mobile device; and in each case, generating the indication of a change in distance between the mobile device and the face of the user.

15. The system of claim 14, wherein the facial proximity system further comprises:

a viewing angle module determining a change in the user's viewing angle of the display screen by determining a viewing angle change associated with the signal representing acceleration of the mobile device; and the graphical user interface control system further receives an indication of the change in viewing angle of the display screen and, and upon determining that the viewing angle has changed, modifying the perspective of the rendering of the graphical object on the display screen.

16. The system of claim 15, modifying the perspective of the rendering of the graphical object on the display screen comprises replacing at least one selectable object with a non-selectable object.

* * * * *